Jan. 8, 1935.  K. C. D. HICKMAN  1,987,062
APPARATUS FOR TINTING PHOTOGRAPHIC FILM
Filed May 13, 1929   2 Sheets-Sheet 1
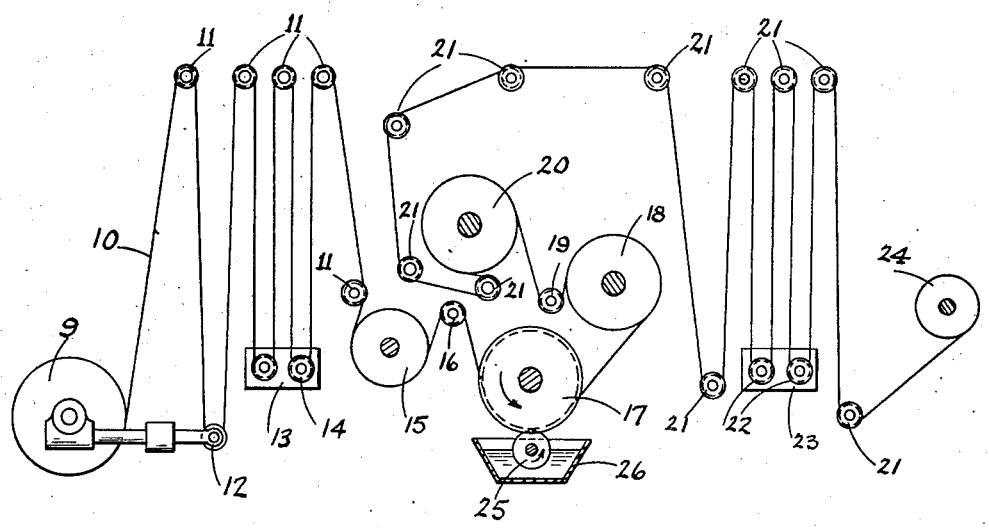
Fig.-1
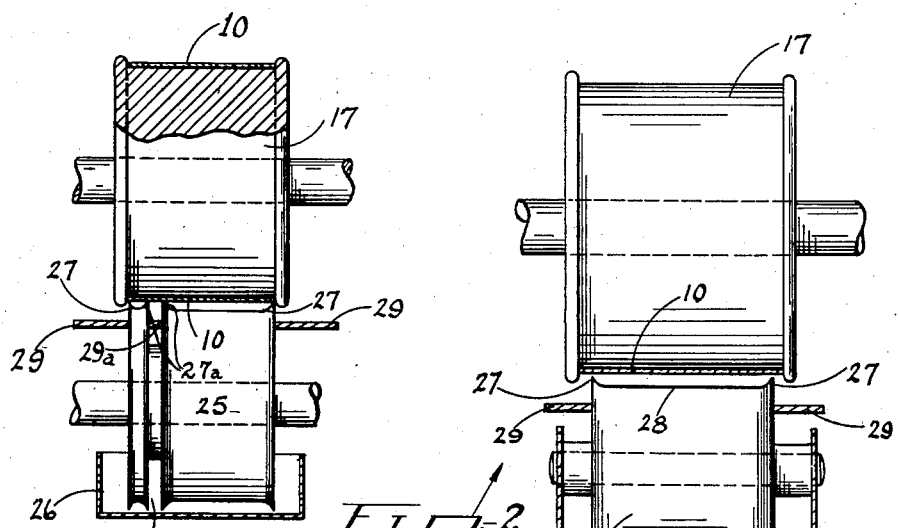
Fig.-3   Fig.-2
Fig.-10
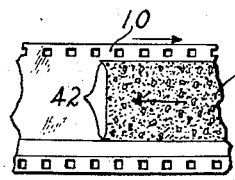
INVENTOR
Kenneth C. D. Hickman
BY
ATTORNEY INVENTOR
Kenneth C. D. Hickman
BY
N. M. Perrins
ATTORNEY Patented Jan. 8, 1935

1,987,062

UNITED STATES PATENT OFFICE 1,987,062

APPARATUS FOR TINTING PHOTOGRAPHIC FILM

Kenneth C. D. Hickman, Rochester, N. Y., assignor to Eastman Kodak Company, Rochester, N. Y., a corporation of New York Application May 13, 1929, Serial No. 362,844

2 Claims. (Cl. 88—16.2)

This invention relates to an apparatus for tinting motion picture film.

It is now customary to employ tinted motion picture film to give various pleasing effects when motion pictures are projected therefrom on a screen. Such tinted film, however, has not gone into wide commercial use for the synchronized production of motion pictures with sound accompaniment from a sound record carried on the same film, owing to the fact that the usual tints vary in their absorption of the radiations to which the sound producing device or light sensitive cell is responsive so that unpleasant volume changes are encountered in passing from one section of tinted film to a differently tinted section. For this reason it has been proposed to tint only the motion picture portion of the film while preserving the sound record portion untinted but even this practice has not proved to be entirely adequate since it has been found especially difficult to maintain sharply defined margins of the tinted layer, a condition which is essential in obtaining satisfactory results when the film is projected.

In accordance with the main feature of the present invention a novel method and suitable means are utilized for uniformly tinting the exposure areas of a motion picture film while the sound track portion thereof is kept untinted. A further feature of the invention includes the novel method of drawing a continuous, tinted layer over an exactly defined portion of a motion picture film including the motion picture exposure areas.

Figure 4:
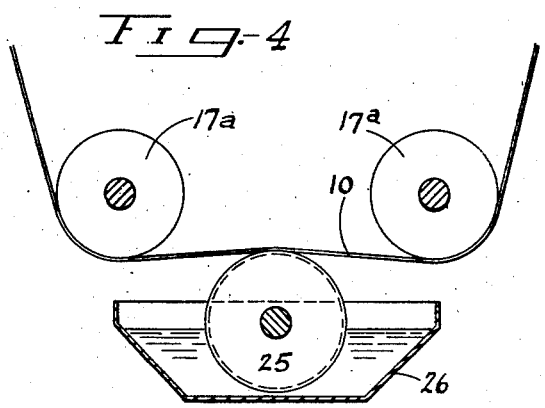
Figure 5:
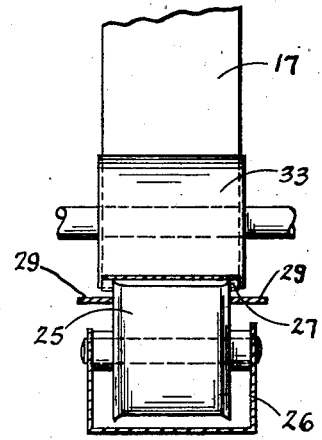
Figure 6:
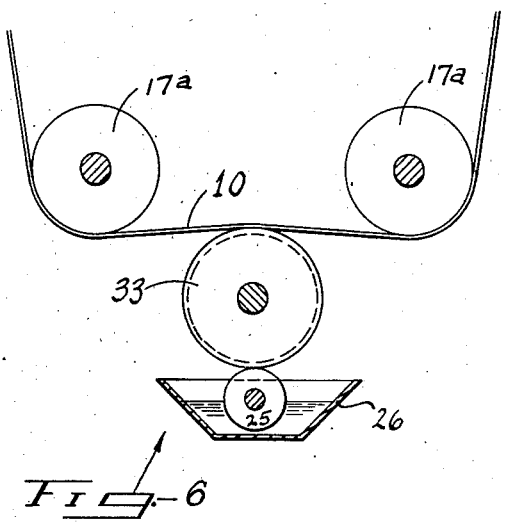
Figure 7:
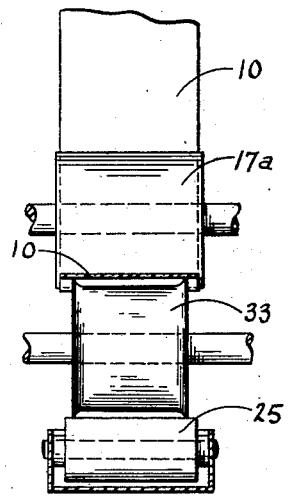
Figures 8, 9:
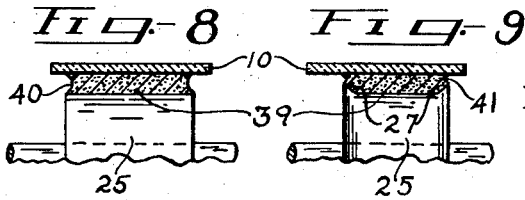

These features and others will appear from the detailed description and appended claims when taken with the drawings in which Fig. 1 is a schematic showing of one form of apparatus for applying a tinted layer to an exactly defined area of a motion picture film while Fig. 2 is a front view of an enlarged detail thereof; Fig. 3 shows a front view partially in section of a modified form of the tint-applying roll, replacing the corresponding roll of the previous arrangement and designed to apply the tinted layer to all portions of the film except the sound record area; Fig. 4 is a schematic side view of a portion of another form of apparatus by which a tinted layer may be applied to an exactly defined area of a motion picture film; Fig. 5 is a sectional front view of a portion of Fig. 4 showing the contour of the tint-applying roll; Figs. 6 and 7 show a side view and a sectional front view respectively of a slightly modified form of apparatus for applying tint to a desired portion of a strip of film; Figs. 8, 9 and 10 are various views useful in explaining the theory of operation, Fig. 8 being a showing of the prior practice and Figs. 9, 10 indicating the principle of the present invention.

One form of the invention as represented in Figs. 1 and 2 includes a reel 9 from which a strip of motion picture film 10 advances about a series of rollers 11 and is held under proper tension by a weight 13 having rollers 14 around which it passes. The film then moves about a heated roll 15, an idler roll 16, heated rolls 17 and 18, idler roll 19 and a further heated roll 20 from which it then passes around rolls 21 and about rolls 22 on a tensioning weight 23, and thence to a take-up reel 24. It will be understood that the provision of the rolls 11 and 21 is merely one possible arrangement of carrying the film strip 10 to and from the heated rolls. An essential feature of this arrangement, however, includes the heated roll 17 and one or more heating rolls 15, 18 and 20, which are provided to dry the solvent bearing the tint in a very short interval of time. While the film is passing about the heated roll 17, a tinted layer is applied to the desired area of one surface thereof by tint-applying roller 25 rotating in a direction such that the adjacent surfaces of the rolls 17 and 25 move in opposite directions and dipping into a reservoir 26 of a suitable dye or tint. This roll 25, as shown in Fig. 2, is provided with flanges 27 so positioned that the distance between their edges and the lower surface 27a of the film 10 may be one or one and one-half thousandths of an inch. The distance between the main portion of the surface 28 of this roll and the lower surface of the film may be seven or eight thousandths of an inch. These dimensions, however, vary with the viscosity of the dye or tint and other variables. It should be understood that the thickness of the tinted layer when applied may be controlled by the speed of the roll 25 or by the space between the roll 25 and the surface of film 10 or by the speed of the film travel as controlled in part by the speed of the roll 17. Since the roll 17 rotates slower than the tinting roll 25 and since the adjacent surfaces of these rolls move in opposite directions without the flanges 27 engaging the surface of the film 10, a bead of tint of a width corresponding to the distance between the flanges is drawn as a ribbon or band having accurately defined edges, on one surface of the film. In order that the sides of the flanges may be kept free front tint and therefore insure an exact margin, scrapers 29 remove any tint that adheres to these parts.

In certain instances it is desirable to tint all portions of one surface of the film 10 except the sound track in order to reduce distortion of the film due to shrinkage resulting from the solvent attacking its surface. For coating the film in this manner there is shown in Fig. 3 a modified form of the tint-applying roll 25 provided with a groove 32 extending around its periphery and bounded by additional flanges 27a. An additional scraper 29a engages the sides of the flanges 27a to prevent color adhering at that portion thereof engaging the film 10. The distance between the flanges 27 and the film surface and between the surface 28 and the surface of the film may be substantially the same as those defined in connection with the roll 25 shown in Figs. 1 and 2.

Instead of supporting the film 10 by a roller 17 at the point where the tinted layer is being applied, the film, as shown in Figs. 4 and 5, may be held taut between the two heated rolls 17a, 17a while the flanged roller 25 applies a layer of tint from the reservoir 26 to the film section supported between the mentioned pair of rolls. In this way a somewhat larger section of film engages the periphery of the roll.

In Figs. 6 and 7 an intermediate flanged roll 33 is interposed between the film strip 10 and the roll 25 which supplies tint from the reservoir to the surface of this intermediate roll.

I have found in practice that if a plain roll without flanges is used to apply tint the edges of the tinted layer when applied to a film support will be ragged and irregular whereas when the tint applying roll is provided with flanges the layer when placed on the film support will have regular, accurately defined margins. Although I do not wish to be limited to any theory of operation, it is my opinion that these results may be explained as follows. It is essential that the tinted layer on the film be of a certain thickness in order to present the proper color effects when the film is projected and as shown in Fig. 8 the tint layer 39 between the roll 25 and the film 10 is of substantial thickness. This results in a relatively large meniscus 40, the upper edge of which is thin and since the tint does not wet all portions of the surface of the film 10 equally the edges of the tinted band are irregular. However, as shown in Fig. 9, when the tint-applying roll 25 is provided with flanges 27, the thickness of the tint layer may be as great as is necessary to give uniform color effects from the film, but in this instance the meniscus 41 is relatively narrow so that the flanges 27 wet the surface of the film 10 with the tint and if the film and the roller 25 are moving in opposite directions the tinted layer 39 is drawn or flowed uniformly over the area between the lines on the film which have been wet by the flanges 27. As best shown in Fig. 10 the film 10 is wet with tint at the layer margins 42 by the flanges 27 (not shown in this figure) and the remainder of the tint layer lags behind these margins when the film and the layer are moving in the directions indicated.

I am aware that plain rolls similar to roll 25 as shown in Fig. 8 have been used to impress or imprint a tint or color on a surface but such an arrangement, for reasons given above, has proved to be unsatisfactory in applying a band or ribbon of tint to a predetermined portion of a motion picture film where the margin of the band or layer must be accurately and regularly defined.

What I claim is:

1. In a device for tinting a predetermined area of a motion picture film, means for advancing the film, a roll having a surface defined by flanges, said flanges being in close relation but out of engagement with said film, means for rotating said roll in a direction opposite to the movement of the film, and means for applying a tint to said roll.

2. In a device for tinting a predetermined area of a motion picture film, means for advancing said film, a roll having a surface defined by flanges in close relation to but out of engagement with said film, and means for rotating said roll in a direction opposite to the movement of said film and at a different speed.

KENNETH C. D. HICKMAN.